(12) United States Patent
Makke et al.

(10) Patent No.: US 9,886,708 B2
(45) Date of Patent: Feb. 6, 2018

(54) METHOD AND APPARATUS FOR SECURE PROCESSING OF FUEL DELIVERY REQUESTS

(71) Applicant: FORD GLOBAL TECHNOLOGIES, LLC, Dearborn, MI (US)

(72) Inventors: Omar Makke, Lyon Township, MI (US); Joseph Wisniewski, Royal Oak, MI (US); Kevin Lee Helpingstine, Ferndale, MI (US); Perry Robinson MacNeille, Lathrup, MI (US); Nicholas Colella, Grosse Ile, MI (US); David Hamilton, Troy, MI (US); Matthew S. Blackburn, Livonia, MI (US); Aiswarya Kolisetty, Chennai (IN)

(73) Assignee: Ford Global Technologies, LLC, Deaborn, MI (US)

( * ) Notice: Subject to any disclaimer, the term of this patent is extended or adjusted under 35 U.S.C. 154(b) by 89 days.

(21) Appl. No.: 15/011,998

(22) Filed: Feb. 1, 2016

(65) Prior Publication Data

US 2017/0221116 A1   Aug. 3, 2017

(51) Int. Cl.

| G06Q 30/06 | (2012.01) |
|---|---|
| B67D 7/04 | (2010.01) |
| B67D 7/22 | (2010.01) |
| B67D 7/34 | (2010.01) |
| G06Q 20/12 | (2012.01) |
| G06Q 20/36 | (2012.01) |

(Continued)

(52) U.S. Cl.
CPC ........... *G06Q 30/0609* (2013.01); *B67D 7/04* (2013.01); *B67D 7/224* (2013.01); *B67D 7/348* (2013.01); *G06Q 20/12* (2013.01); *G06Q 20/367* (2013.01); *H04L 61/6022* (2013.01); *H04L 67/12* (2013.01); *H04W 76/023* (2013.01); *B60K 15/05* (2013.01); *B60R 25/24* (2013.01); *B60S 5/02* (2013.01); *B67D 7/145* (2013.01); *G01S 19/13* (2013.01); *G05B 15/02* (2013.01); *G06Q 20/14* (2013.01); *G06Q 20/20* (2013.01); *G06Q 20/22* (2013.01); *G06Q 2220/00* (2013.01); *G07C 5/0808* (2013.01); *G08B 5/22* (2013.01)

(58) Field of Classification Search
CPC ....... B60S 5/02; B60K 15/05; B06Q 30/0609; B67D 7/04; B67D 7/224; B67D 7/348; B67D 7/84; B67D 7/02; G06Q 20/12; G06Q 20/20; G06Q 30/02; G06Q 50/06; G06Q 20/207; G06Q 20/22; H04L 61/6022; H04L 67/12; H04W 76/023; G01S 19/13; G07C 5/0808; B64C 19/00; B64C 39/024; G08B 5/22; F02D 28/00; F02D 19/0697; G06F 19/00
See application file for complete search history.

(56) References Cited

U.S. PATENT DOCUMENTS

2004/0083030 A1   4/2004 Sumida et al.
2011/0136429 A1   6/2011 Ames et al.
(Continued)

*Primary Examiner* — Behrang Badii
(74) *Attorney, Agent, or Firm* — Jennifer Stec; Brooks Kushman P.C.

(57) ABSTRACT

A system includes a processor configured to wirelessly instruct fuel dispensation initiation over a direct wireless connection between a vehicle and a refueling truck, responsive to a wireless request made by the refueling truck, the request including a valid token and a refueling truck MAC ID with which the wireless connection is established.

6 Claims, 3 Drawing Sheets

(51) Int. Cl.
  *H04L 29/12* (2006.01)
  *H04L 29/08* (2006.01)
  *H04W 76/02* (2009.01)
  *G06Q 20/22* (2012.01)
  *G01S 19/13* (2010.01)
  *G06Q 20/20* (2012.01)
  *B60K 15/05* (2006.01)
  *B60S 5/02* (2006.01)
  *G07C 5/08* (2006.01)
  *G06Q 20/14* (2012.01)
  *B67D 7/14* (2010.01)
  *G05B 15/02* (2006.01)
  *G08B 5/22* (2006.01)
  *B60R 25/24* (2013.01)

(56) References Cited

U.S. PATENT DOCUMENTS

| | | | |
|---|---|---|---|
| 2013/0001246 A1* | 1/2013 | Birkler | B67D 7/406 222/23 |
| 2013/0282500 A1* | 10/2013 | Latorre | G06Q 20/20 705/17 |
| 2014/0077936 A1 | 3/2014 | Brown et al. | |
| 2015/0220916 A1 | 8/2015 | Prakash et al. | |
| 2016/0140533 A1* | 5/2016 | Milligan | G06Q 20/207 705/19 |
| 2016/0311410 A1* | 10/2016 | Donzis | G01S 19/13 |

\* cited by examiner

METHOD AND APPARATUS FOR SECURE PROCESSING OF FUEL DELIVERY REQUESTS

TECHNICAL FIELD

The illustrative embodiments generally relate to a method and apparatus for secure processing of fuel delivery requests.

BACKGROUND

On many occasions, drivers reach their destination and notice that the vehicle's fuel level is low. It can be inconvenient to stop by a gas station before leaving the destination, especially when there are no gas stations within the vicinity. For example, a driver may leave work at 4:00 p.m trying to beat the traffic, only to remember that the fuel level is low, forcing a refueling stop and giving time for traffic to form. In other scenarios, the location of the nearby gas stations may be in a high crime-rate area or result in an otherwise undesirable detour (long distance or travel time, unpaved roads, etc.).

SUMMARY

In a first illustrative example, a system includes a processor configured to wirelessly instruct fuel dispensation initiation over a direct wireless connection between a vehicle and refueling truck, responsive to a wireless request made by the refueling truck, the request including a valid token and a truck MAC ID with which the wireless connection is established.

In a second illustrative example, a system includes a processor configured to generate and send a fuel-delivery request responsive to receiving instructions from a vehicle occupant that fuel delivery should occur, the request including vehicle identification information, a desired fuel amount and a token generated by the vehicle for use in fulfilling a fuel delivery.

In a third illustrative example, a system includes a processor configured to detect insertion of a fuel nozzle into a vehicle refueling port. The processor is also configured to wake-up a vehicle telematics system responsive to the detection. The processor is further configured to receive a fuel truck MAC ID and a token from a remote source, at the telematics system, following wake-up. Also, the processor is configured to validate the token and establish a wireless connection with the received MAC ID once the token has been validated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
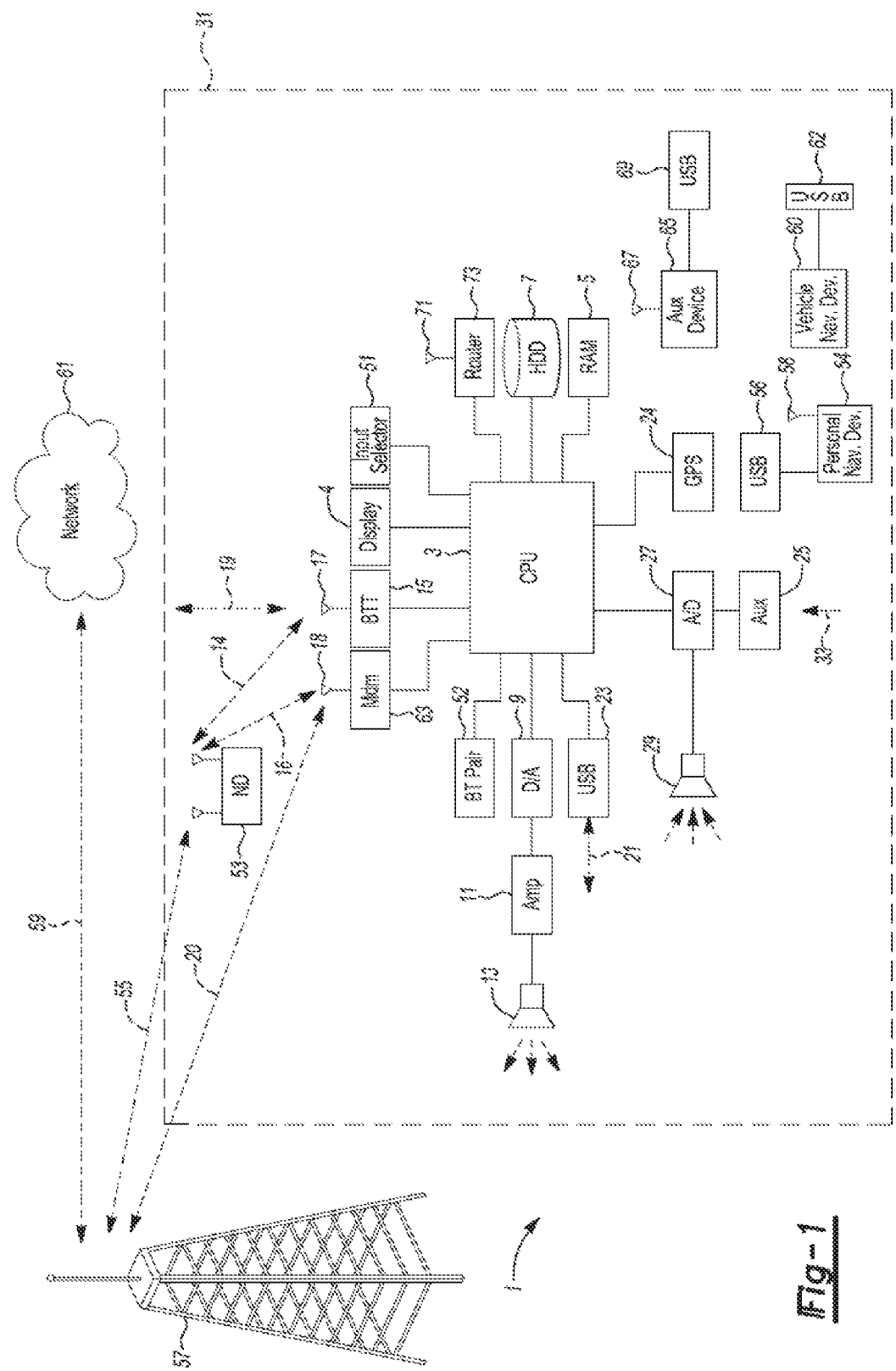
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point. Communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data plan, data over voice, or DTMF tones associated with nomadic device 53. Alternatively, it may be desirable to include an onboard modem 63 having antenna 18 to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, a representative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

A system is proposed where a driver can request fuel delivery to a vehicle. Either through a vehicle telematics unit, or, for example, a smart device, or even a phone call, a driver can contact a remote fuel delivery service and request fuel delivery to a specified vehicle. The driver may provide vehicle location information, such as, for example, GPS, VIN, license plate number, make, model, color, etc., and anything else that can facilitate identification of the vehicle when the fuel truck driver is on-site. The fuel truck driver can bring a load of fuel to the vehicle, communicate wirelessly to allow fuel dispensing and to receive payment, refuel the vehicle and leave, while the vehicle driver has little or no involvement in the process. When the vehicle driver returns to the vehicle, they will find the vehicle filled to the specified amount.

Figure 2:
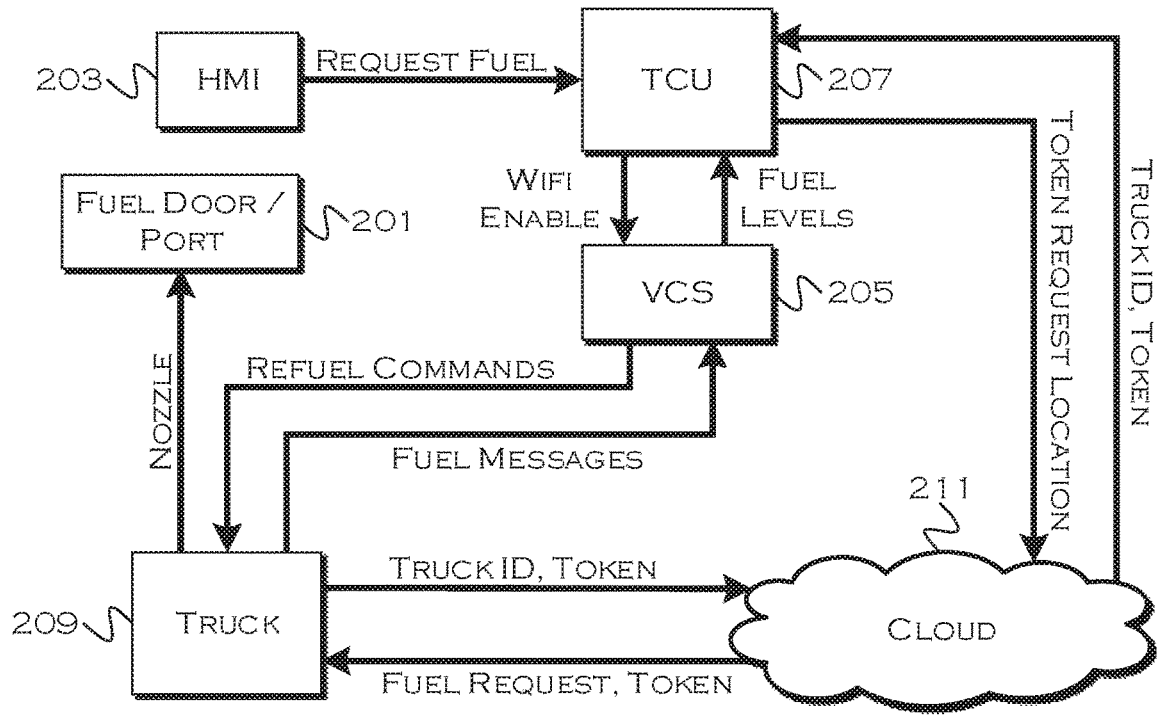
FIG. 2 shows an illustrative system for securely handling a fuel delivery.

FIG. 2 shows an illustrative system for securely handling a fuel delivery. In this illustrative example, the vehicle has a fuel door/fuel port 201 that is in communication with a vehicle computing system. Usability of this port (unlocking, unblocking, etc) can be facilitated by a command from the vehicle computing system, if desired. In other examples, the fuel door or port may always be usable, and may be purely mechanical, having no actual connection to the vehicle computing system. In either arrangement, it is possible to add a mechanism or rely on existing vehicle sensors to detect an amount of dispensed fuel, to ensure the customer is not overcharged.

A driver, using, in this example, the vehicle computing system 205, can send a request (through an human machine interface (HMI) 203) for vehicle refueling. This request, again, in this example, is handled by the vehicle telematics control unit (TCU) 207. The VCS can retrieve and communicate, for example, a current fuel level, a desired fuel level or amount, and any location and vehicle information needed to identify and locate the vehicle. The request information can be sent to the cloud 211 for handling. This information can include, for example, a token for handling the request, a vehicle location, a current fuel volume, vehicle identification information, a desired fuel volume, etc.

The request can then be sent to a refueling company for processing, and they can dispatch a truck 209. When the truck arrives at the vehicle, in this example, the truck can insert a refueling nozzle or otherwise request vehicle access. This can cause the vehicle to awaken, so that handling of the refueling process can occur. The truck (which, in this example, has not yet been validated and is not in direct communication with the vehicle) can send a cloud request including the original token from the vehicle (proving the truck is the requested truck), a vehicle MAC ID, and a TruckID, among other things. This information is passed from the cloud to the TCU, where the TCU can enable vehicle WiFi (for direct communication with the truck) and validate the token (validation can be done via the VCS as well, or another appropriate module). The truck's MAC ID is added to an approved list, at least temporarily, allowing the truck to connect to the VCS using WiFi.

Once validation has completed, the VCS can send a command directly to the truck to begin refueling. A refueling level could again be sent, to confirm the previous request. The VCS can also instruct the truck to stop refueling if the tank is full or a desired level is reached. The truck, upon completion of the process, sends a dispensed fuel amount to the VCS, which can be uploaded to the cloud along with a measured amount dispensed (for verification purposes, to ensure the truck isn't over-reporting dispensed fuel), and a truckID. Payment can be handled through the cloud, through the direct connection with the VCS, or through any other suitable manner. WiFi can then be disabled and the vehicle can return to a full-off state. In other examples, a report may be sent from the TCU and/or the cloud to the driver, so the driver knows that fuel was dispensed, what the cost was, and how much fuel was delivered, as well as any other information that may be useful.

Figure 3:
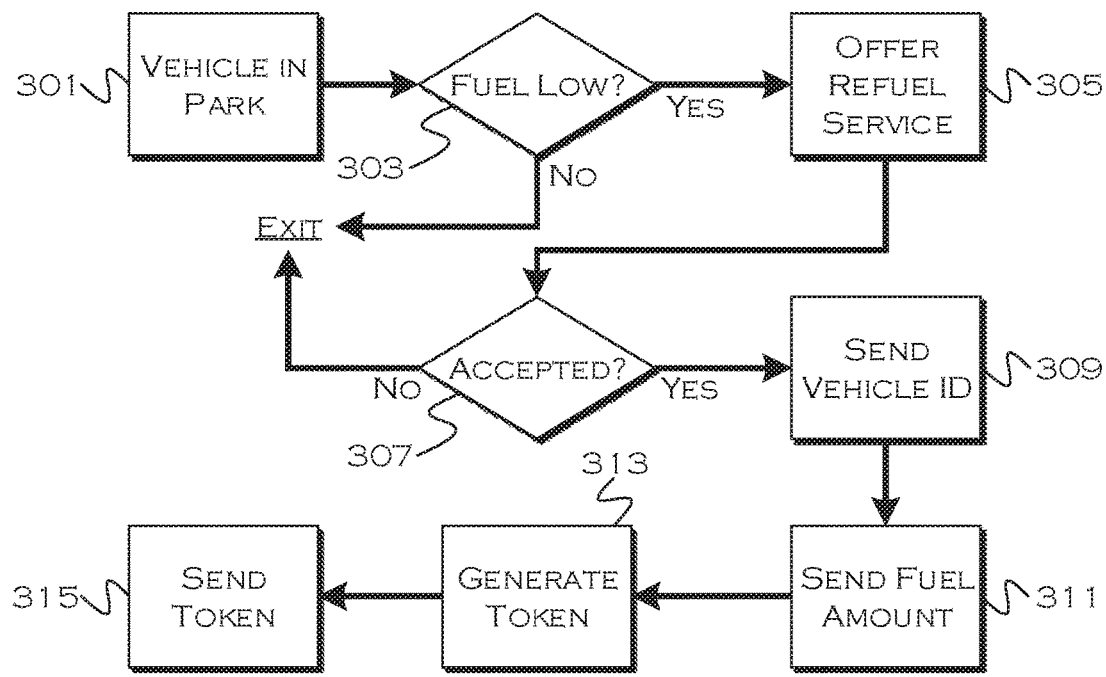
FIG. 3 shows an illustrative fuel request process.

FIG. 3 shows an illustrative fuel request process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, the driver has arrived at a destination and refueling may be desired. The driver can set parameters designating when refueling requests should occur, so as not to be bothered each time the vehicle is parked, although the request-inquiry could also be always-on. For example, the driver could have it set that Mon-Fri, 6 AM-5 PM, if fuel is below 40%, send a request. This will cover typical work times for the driver, and allow for refueling while the driver is at work. Also, if desired, the request-inquiry could shift to an always-on state whenever vehicle fuel levels are below a minimum threshold. In still another example, the system could determine if there is even a delivery service available for an area (through a cloud database of services or service coverage areas, for example) before offering the service. This database could dynamically include current delivery capacity and times for an area as well (i.e., even if an area has service, if a high volume of requests were received, the driver may still not be able to get fuel delivered).

Once the vehicle is parked 301, the process checks to see if the fuel level is low 203, or, in other examples, if any request-inquiry parameters are met. If there is no basis for asking the driver if fuel delivery is desired, the process may exit. Otherwise, the process may provide the driver with a fuel delivery option 305. This can be a simple "would you like fuel delivered" inquiry, or list, in a selectable manner, one or more delivery services that are capable of servicing the driver's request. These can be displayed on an HMI, or output through a vehicle speaker if the HMI is not present. In other examples, the driver may use a smart-device to process the request, although the device may need to be provided with some vehicle identifying information, and may need to transfer some information to the vehicle for handling the request (such as, for example, a token if that method is used for authentication).

If the driver accepts the request-inquiry 307, or otherwise indicates fuel delivery is desired (which could also take the form of an explicit request from the driver, i.e., in the absence of an inquiry the driver can still request fuel delivery), the driver may input a desired fuel amount, cost, etc., as well as fuel-grade if applicable. Vehicle identification information 309 (e.g., without limitation, GPS location, VIN, make, model, color, license plate, etc.) and refueling parameters 311 can be sent to the cloud for handling. The process also, in this example, generates a unique token 313 to be used for handling a connection request when the fuel arrives, and this is sent to the cloud as well 315, for utilization by the fuel truck.

Figure 4:
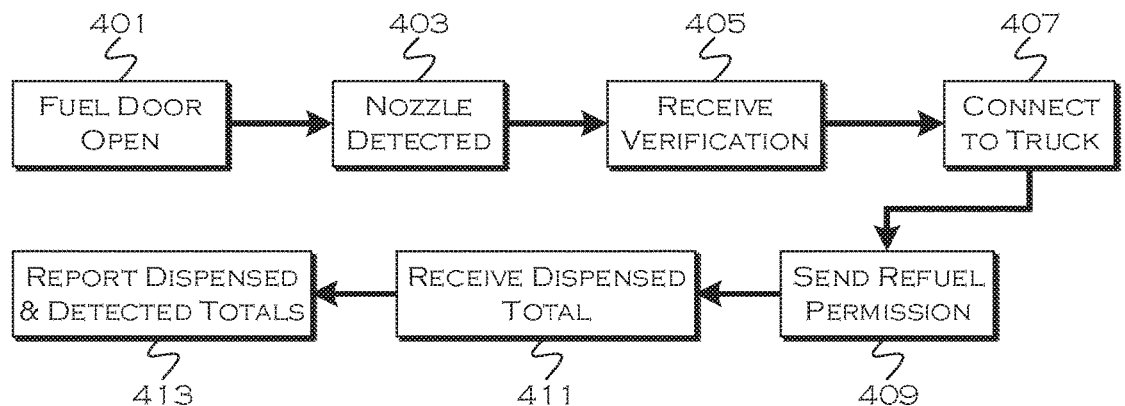
FIG. 4 shows an illustrative fuel reception process.

FIG. 4 shows an illustrative fuel reception process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While communication directly between the vehicle and fuel truck is described, a cloud-intermediary could also be used to handle all this information if a direct connection was not desired or could not be handled. For example, the truck could send all access requests through the cloud to the TCU, and the TCU and/or VCS could send all instructions through the cloud to the truck. Multiple servers could be used in the cloud (for example, a vehicle-OEM server and a refueling company server) to handle these requests as well. The direct connection may allow for faster command processing, however, as using the cloud model may result in a slight delay when, for example, a stop fueling instruction is sent.

In this example, when the truck arrives at the vehicle, the process determines that a fuel door (if present) has been opened 401 and a nozzle is detected 403. In other examples, such as with vehicles having locked fuel doors, the truck may have to send a notification through the cloud that it has arrived, which can cause the fuel door to be unlocked for use. Or, in still another example, a truck could notify a user that it had arrived, and the user could be provided with one or more vehicle camera images through which the user can verify this notification and instruct unlock of the fuel door.

In this present example, the truck driver inserts a nozzle, which then can cause the vehicle to verify a token sent by the truck to the vehicle through the cloud 405 (such verification could also be done at the cloud-level). The truck's MAC ID, also provided by the truck in this example, is used to wirelessly connect directly between the vehicle and the truck. 407. Refueling permission and/or a start-command can then be sent to the truck, wirelessly from the vehicle 409. Once an appropriate amount of fuel (the requested amount, or a "full" amount) has been dispensed, the process can issue a stop-command. In response to the stop command (or while refueling is on-going), the process can receive a dispensed-amount of fuel 411. This can be compared to a measured amount of fuel dispensed, and/or reported to the cloud 413, along with a Truck ID, to ensure that the numbers match. Payment can be handled by the vehicle to the truck, by the cloud, or by any other suitable manner.

Figure 5A:
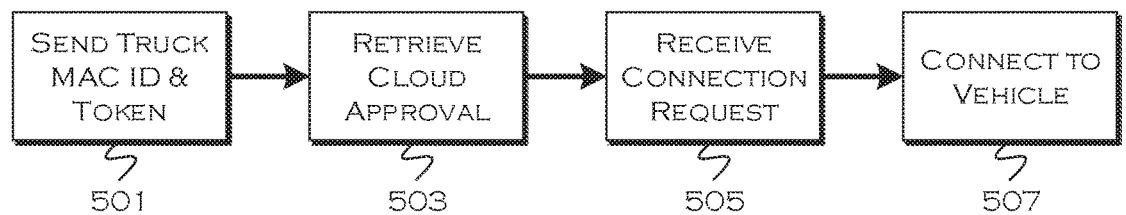
FIGS. 5A and 5B show illustrative connection processes for fuel-truck connection.
Figure 5B:
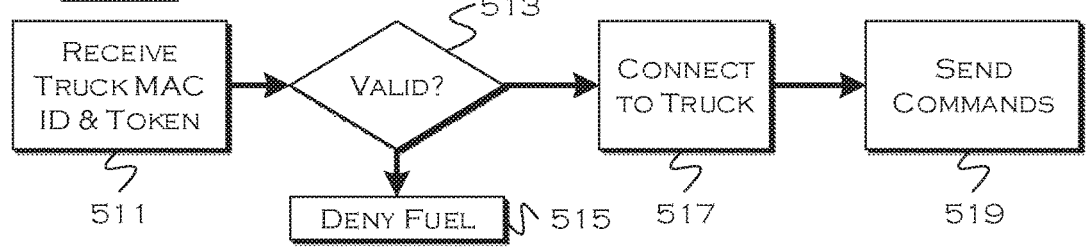

FIGS. 5A and 5B show illustrative connection processes for fuel-truck connection. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the methods, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the methods or some reasonable variation thereof.

FIG. 5A shows an illustrative truck-side process. In this example, prior to arriving or upon arrival, the truck will send (or have a server send on its behalf) a MAC ID and the token provided with the original fuel delivery request 501. Approval to connect to the vehicle (once the truck is on-site, for example) can be received from the cloud 503. This can result from, for example, verification of the token. A connection request is then received by the truck from the VCS 505, and since the truck has the appropriate MAC ID it can connect wirelessly to the vehicle 507. Communication for control of refueling and/or other purposes can then continue.

FIG. 5B shows an illustrative example of a vehicle-side process for connection with the truck over WiFi or other suitable wireless medium. The vehicle receives the truck's MAC ID and the token (originally generated by the vehicle, in this example) 511. The vehicle will validate the token 513, and, if invalid, deny the refueling process 515. Denial can take any number of forms, if the vehicle can physically prevent refueling it may do so, in other examples, the vehicle will deny direct wireless connection to the truck and/or refuse to send any refueling commands or payment.

If the token is valid, the process will connect the vehicle and the truck over a wireless connection 517. Commands relating to refueling can then be sent 519, as well as refueling parameters and/or refueling data (amount dispensed, cost, etc.).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
detect insertion of a fuel nozzle into a vehicle refueling port;
wake-up a vehicle telematics system responsive to the detection;
receive a fuel truck MAC ID and a token from a remote source, at the telematics system, following wake-up;
validate the token; and
establish a wireless connection with the received MAC ID once the token has been validated.

2. The system of claim 1, wherein the processor is further configured to send refueling control commands over the wireless connection.

3. The system of claim 1, wherein the processor is further configured to receive dispensed fuel reporting over the wireless connection.

4. The system of claim 3, wherein the processor is further configured to report dispensed fuel received with the reporting, dispensed fuel measured by the vehicle, and a truck ID, to a remote device.

5. The system of claim 1, wherein the processor is further configured to report fuel dispensation completion to a user wireless device.

6. The system of claim 1, wherein the processor is further configured to instruct wireless payment for dispensed fuel upon fuel dispensation completion.

* * * * *